United States Patent [19]

Hatton

[11] Patent Number: 4,760,742
[45] Date of Patent: Aug. 2, 1988

[54] MULTI-PHASE PETROLEUM STREAM MONITORING SYSTEM AND METHOD

[75] Inventor: Gregory J. Hatton, Houston, Tex.
[73] Assignee: Texaco Inc., White Plains, N.Y.
[21] Appl. No.: 36,951
[22] Filed: Apr. 10, 1987
[51] Int. Cl.[4] ........................ G01F 15/08; G01F 1/74
[52] U.S. Cl. ................................. 73/861.04; 73/200; 55/36; 55/159
[58] Field of Search ................. 73/861.04, 200; 55/36, 55/159

[56] References Cited

U.S. PATENT DOCUMENTS

| | | | |
|---|---|---|---|
| 2,831,350 | 4/1958 | Banks et al. | 73/200 |
| 3,006,189 | 10/1961 | Warren et al. | 73/861.04 |
| 4,429,581 | 2/1984 | Furmaga | 73/861.04 |
| 4,688,418 | 8/1987 | Cheung et al. | 73/200 X |

FOREIGN PATENT DOCUMENTS

| | | | |
|---|---|---|---|
| 2134873 | 11/1972 | France | 55/159 |
| 931735 | 7/1963 | United Kingdom | 55/159 |

*Primary Examiner*—Herbert Goldstein
*Attorney, Agent, or Firm*—Robert A. Kulason; James J. O'Loughlin; Ronald G. Gillespie

[57] ABSTRACT

A monitoring system and method monitors the gas flow rate, the liquid flow rate, and the water cut of liquid in a multi-phase petroleum stream which includes stratifying the petroleum stream by having it flow down a decline at a predetermined angle to the horizontal. The stratified stream flows into a gas trap from which the liquid exits by a liquid exit pipe which is connected to another section of the pipeline. A gas accumulator is connected to the stratifying pipe and to the gas trap and collects the gas from them. A gas exit pipe is connected to the accumulator and to the other section of the pipeline and allows the gas to flow from the accumulator to the pipeline. A gas flow rate meter is connected to the gas exit pipe and provides a signal corresponding to the gas flow rate. A liquid flow rate meter is connected to the liquid exit pipe and provides a liquid flow rate signal. A water cut meter is connected to the liquid exit pipe and provides a signal corresponding to the water cut of the liquid exiting the trap.

9 Claims, 1 Drawing Sheet

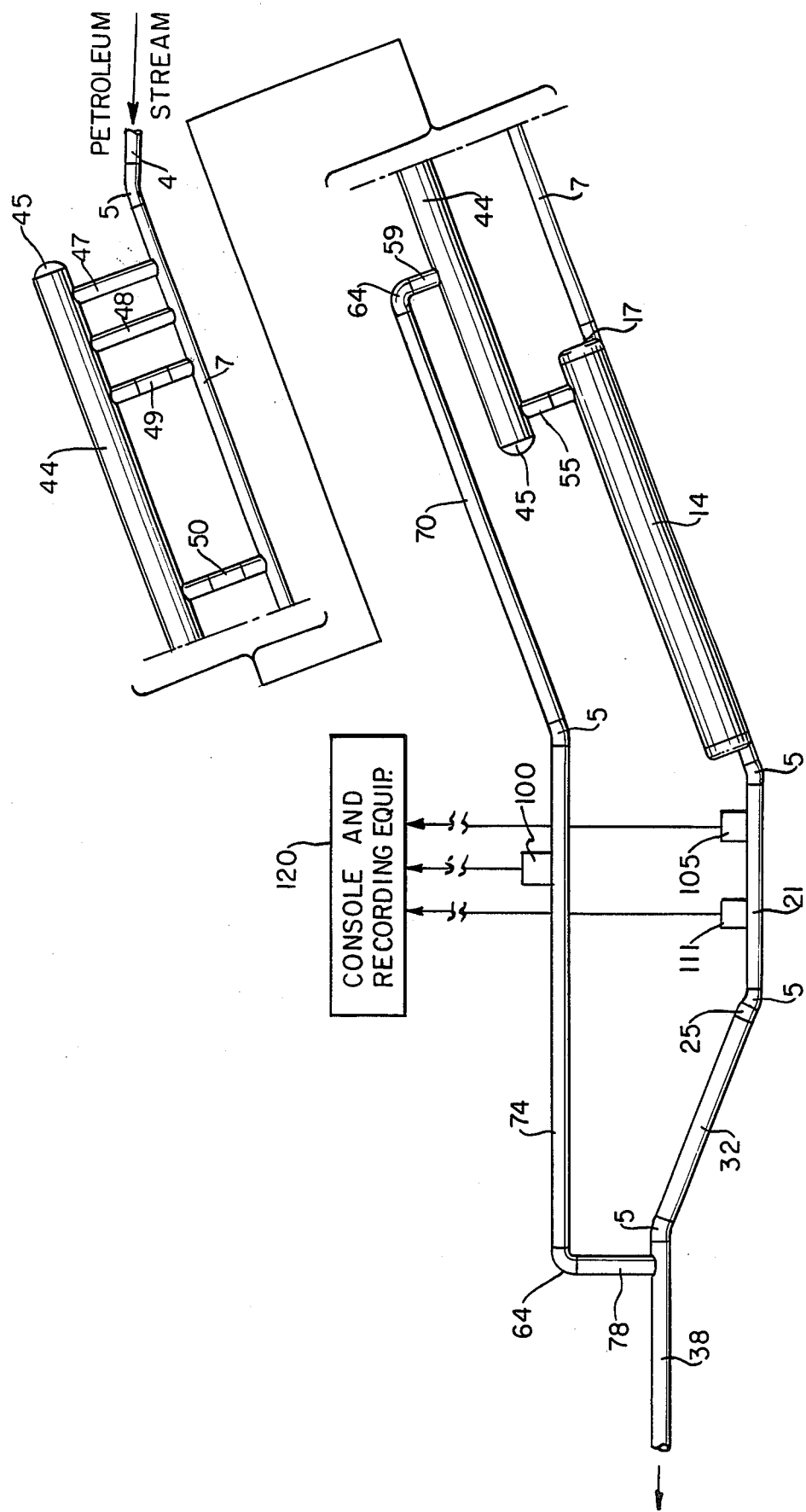

MULTI-PHASE PETROLEUM STREAM MONITORING SYSTEM AND METHOD

BACKGROUND OF THE INVENTION

Field of the Invention

The present invention relates to monitoring systems and methods in general and, more particularly, to a monitoring system and method for a multi-phase petroleum stream.

SUMMARY OF THE INVENTION

A monitoring system and method monitors the gas flow rate, the liquid flow rate, and the water cut of liquid in a multi-phase petroleum stream which includes stratifying the petroleum stream by having it flow down a decline at a perdetermined angle to the horizontal. The stratified stream flows into a gas trap from which the liquid exits by a liquid exit pipe which is connected to another section of the pipeline. A gas accumulator is connected to the stratifying pipe and to the gas trap and collects the gas from them. A gas exit pipe is connected to the accumulator and to the other section of the pipeline and allows the gas to flow from the accumulator to the pipeline. A gas flow rate meter is connected to the gas exit pipe and provides a signal corresponding to the gas flow rate. A liquid flow rate meter is connected to the liquid exit pipe and provides a liquid flow rate signal. A water cut meter is connected to the liquid exit pipe and provides a signal corresponding to the water cut of the liquid exiting the trap.

The objects and advantages of the invention will appear more fully hereinafter from a consideration of the detailed description which follows, taken together with the accompanying drawing, wherein one embodiment of the invention is illustrated by way of example. It is to be expressly understood, however, that the drawing is for illustration purposes only and is not to be construed as defining the limits of the invention.

DESCRIPTION OF THE DRAWING

The drawing is a partial schematic and partial simplified block diagram of a multi-phase monitoring system constructed in accordance with the present invention.

DESCRIPTION OF THE INVENTION

With reference to the Figure, a multi-phase petroleum production stream is flowing in a sub-sea pipe 4. Pipe 4 nominally in this example, is a 4 inch diameter pipe. Petroleum stream from pipe 4 is fed into another pipe 7 which is also 4 inch diameter, but it is declined at a predetermined level in a range of angles from 10° to 80°. It should be noted that all angles are with regards to the horizontal and can be the same but it is not necessary that the angles actually be the same. In the present example, a preferred angle of is 22½° degrees is used. Pipe 7 is connected to a 10 inch diameter pipe 14 with a suitable coupling 17. Pipe 14 functions as a gas trap. The end of pipe 14 is connected to a 3 inch pipe 21 through couplings 17 and 5 so that pipe 21 is in the horizontal plane. Pipe 21 is connected to another coupling 5 to a 2 diameter size coupling 25, which in turn is connected to a 4 inch pipe 32. Pipe 32 is connected to pipeline 38 by a coupling 5 where pipeline 38 is in the horizontal, but is not at the same level as the entry pipeline 38.

A gas accumulator pipe 44 is connected to pipe 7 by connecting pipes 47 through 50. As can be seen in the Figure, connecting pipes 47, 48 and 49 are relatively close together, while connecting pipe 50 is spaced further apart. A connecting pipe 55 connects pipe 14 to accumulator pipe 44 in a manner so that connecting pipe 55 is located near the upper end of pipe 14. It should be noted that pipe 44 is essentially parallel to the longitudinal axis for pipes 7 and 14.

Accumulator pipe 44 has a pipe 59 which is connected to a 90° elbow 64 which in turn is connected to a 4 inch pipe 70. Again, due to the 90° fitting 64 and the fact that the outlet fitting 59 is perpendicular to the longitudinal axis of pipe 44, pipe 70's longitudinal axis is substantially parallel to the axis of pipe 44 and pipes 44 and pipes 14 and 7.

Pipe 70 is connected to another 4 inch pipe 74 by coupling 5 so that pipe 74's longitudinal axis is substantially horizontal. Pipe 74 is connected to a 90° elbow 64 which in turn is connected to a pipe 78, which has entry into pipeline 38. For an idea of size, the distance of the inclined pipeline carrying liquid from the lower end of coupling 5 to the upper coupling 5 is approximately 25 feet. The gas accumulator pipe 44 is approximately 17 feet. The inclined portion of the gas pipe is in the neighborhood of 5 feet, while the horizontal portion is approximately 10½ feet. All angles used in the foregoing example are 22½°, but as noted before, the preferred range is anywhere from 10° to 80°.

A conventional type gas flow meter 100 provides a signal corresponding to the gas flow rate, while a conventional liquid flow meter 105 provides a signal representative of the liquid flow rates. A water cut meter 111, which may be of a conventional capacitive type, provides a signal corresponding to the water cut of the liquid flowing in pipe 21. The signals from meters 100, 105 and 111 are provided to a console and recording equipment 120 on an offshore platform (not shown) for review and recordation.

In operation the multi-phase petroleum stream in pipe 4 with the assist of gravity travels down through pipes 17 and 14. Due to the inclination and turbulence, gas starts breaking free from the liquid and rises to the top of pipes 7 and 14 and enters accumulator 44 by way of the connected pipes 47 through 50 and connecting pipe 55. The liquid continues down through pipe 7 still freeing up gas, to where it reaches pipe 21. Due to the constriction of pipe 21 and the fact that it is horizontal, liquid backs up in pipe 14, further facilitating the gas to accumulate in the upper portion of pipe 14. The trapped gas enters accumulator pipe 14 via connecting pipe 55 so that the fluid flowing through pipe 21 is substantially all liquid. As the gas builds up in accumulator 44 it forces gas to exit through pipe 70 which then feeds through pipe 74 and then down to pipe 78 and back into the petroleum stream through exiting pipe 38.

The invention as hereinbefore described is a system and a method of monitoring the gas flow rate, the liquid flow rate and the water cut of a multi-phase petroleum stream.

What is claimed is:

1. An inline multiphase petroleum stream pipeline monitor comprising:
   stratifying means connected to an upstream section of the pipeline for stratifying the petroleum stream by causing the stream to flow down a decline at a predetermined angle to the horizontal,
   trap means connected to the stratifying means for forming a gas trap, liquid exit means connected to the trap means and to another section of the pipeline for allowing liquid to exit from the trap means to a downstream section of the pipeline;

accumulator means connected to the stratifying means and to the trap means for accumulating gas from the stratifying means and the trap means, gas exit means connected to the accumulator means and to the downstream section of the pipeline for allowing gas to exit from the accumulator means to the other section of the pipeline so as to recombine the petroleum stream;

gas flow rate means connected to the gas exit means for providing a signal corresponding to the gas flow rate, liquid flow rate means connected to the liquid exit means for providing a signal corresponding to the liquid flow rate, and water cut means connected to the liquid exit means for providing a signal corresponding to the water cut of the liquid; and in which the liquid exit means includes a pipe arranged in a horizontal position and has one end connected to the trap means and whose diameter is less than the diameter of the stratifying means pipe, a length of pipe connecting the pipe of the liquid exit means to the downstream section of the pipeline having the same diameter as the pipe in the pipeline, and the liquid flow rate means and the water cut means are connected to the pipe in the liquid exit means.

2. A system as described in claim 1 in which the range of angles for the decline is from 10° to 80° from the horizontal.

3. A system as described in claim 2 in which the stratifying means is a length of pipe.

4. A system as described in claim 3 in which the trap means is a length of pipe of a substantially greater diameter than the stratifying means pipe.

5. A system as described in claim 4 in which the accumulator means is connected to the stratifying means and to the trap means by a series of pipes which are slightly smaller in diameter than the stratifying means pipe.

6. A system as described in claim 5 in which the accumulator means includes a pipe greater in diameter than the stratifying means pipe but lesser in diameter than the trap means pipe.

7. A system as described in claim 6 in which the gas exit means includes a first length of pipe connected to the accumulator means pipe and having the same diameter as the pipe in the pipeline, and a second pipe arranged in a horizontal level and connected to the first length of pipe in the gas exit means and to the other section of the pipeline.

8. A method for monitoring a multi-phase petroleum stream flowing in a pipeline comprising the steps of:

stratifying the petroleum stream by causing the stream to flow down a decline in a pipe connected to an upstream section of the pipeline at a predetermined angle to the horizontal, trapping the gas in the petroleum stream using a gas trap, allowing liquid to exit from the gas trap to a downstream section of the pipeline, accumulating gas from the stratifying pipe and the gas trap with an accumulator, allowing gas to exit from the accumulator means to the downstream section of the pipeline, measuring the flow rate of the gas as the gas exits from the accumulator and providing a signal corresponding to the gas flow rate, measuring the flow rate of the liquid as the liquid exits the gas trap and providing a signal corresponding to the liquid flow rate, and measuring the water cut of the liquid as the liquid exits the gas trap and providing a signal corresponding to the water cut of the liquid in which the liquid exit step includes connecting a first length of pipe, arranged in a horizontal position to the gas trap, said first length of pipe having a diameter less than the diameter of the pipe used in the stratifying step, and connecting a second length of pipe, having a diameter greater than the first length of pipe, to the first length of pipe and to the downstream section of the pipeline; and in which the liquid flow rate measuring step and the water cut measuring step are performed on the liquid as the liquid flows through the first length of pipe section in the liquid exit step.

9. A method as described in claim 8 in which the range of angles for the decline is from 10° to 80° from the horizontal.

* * * * *